(12) United States Patent
Redd et al.

(10) Patent No.: US 6,822,970 B1
(45) Date of Patent: Nov. 23, 2004

(54) GLASSWARE FORMING SYSTEM WITH STAR NETWORK COMMUNICATION CONFIGURATION

(75) Inventors: Matthew D. Redd, Toledo, OH (US); D. Wayne Leidy, Perrysburg, OH (US); Jay E. Werner, Toledo, OH (US)

(73) Assignee: Owens-Brockway Glass Container Inc., Toledo, OH (US)

( * ) Notice: Subject to any disclaimer, the term of this patent is extended or adjusted under 35 U.S.C. 154(b) by 0 days.

(21) Appl. No.: 09/495,273

(22) Filed: Jan. 31, 2000

(51) Int. Cl.[7] ............................................... H04L 12/44
(52) U.S. Cl. ........................ 370/446; 370/445; 370/463
(58) Field of Search .................................. 370/445–447, 370/463; 250/340; 65/377, 29, 158, 29.1, 29.12, 160, 207, 303, 304, 484

(56) References Cited

U.S. PATENT DOCUMENTS

| | | |
|---|---|---|
| 3,968,368 A | 7/1976 | Sager |
| 4,459,589 A | 7/1984 | Ito |
| 4,491,942 A | 1/1985 | Witte et al. |
| 4,654,889 A | 3/1987 | Shutterly |
| 4,723,311 A | 2/1988 | Moustakas et al. |
| 4,762,544 A | 8/1988 | Davey |
| 4,805,170 A | 2/1989 | Fergeson et al. |
| 4,813,012 A | 3/1989 | Valeri et al. |
| 5,127,067 A | 6/1992 | Delcoco et al. |
| 5,580,366 A | 12/1996 | Farkas et al. |
| 5,604,748 A | 2/1997 | Date et al. |
| 5,617,282 A | 4/1997 | Rall et al. |
| 5,624,473 A | 4/1997 | Farkas et al. |
| 5,903,565 A * | 5/1999 | Neuhaus et al. ............. 370/402 |
| 5,999,389 A * | 12/1999 | Luebke et al. ................ 361/68 |
| 6,311,101 B1 * | 10/2001 | Kastner ....................... 700/197 |
| 6,428,639 B1 * | 8/2002 | Oldenburg et al. ........... 156/64 |

OTHER PUBLICATIONS

Anthony et al., "CANbus and Microcontroller Use in the BaBar Detector at SLAC", Jun. 1999, IEEE, Real Time Conference Jun. 14–18, 1999, Santa Fe, 11th IEEE NPSS, pp. 260–263.*

International Organization for Standardization, "ISO 11898:1993(E) Road Vehicles—Interchange of Digital Information—Controller Area Network (CAN) for high–speed communication", Nov. 1993, International Organization for Standardization, pp. 1–58.*

* cited by examiner

*Primary Examiner*—Huy D. Vu
*Assistant Examiner*—Justin Philpott

(57) ABSTRACT

A glassware forming system that includes a plurality of electronic devices for performing operations on articles of glassware. These devices may comprise devices for controlling the glassware forming operation by controlling one or more operating mechanisms of a glassware forming system, or may comprise devices for inspecting articles of glassware for commercial variations that may affect commercial acceptability of the glassware and call for possible adjustment or repair of the glassware forming system. A network interconnects the devices for intercommunication among the devices, and includes a star network hub and conductors connecting the hub to the plurality of devices in a star network configuration for bidirectional communication among the devices through the hub. The star network hub includes a hub controller for controlling operation of the hub according to a CANbus communication protocol, circuitry for sensing initiation of communication from one of the devices, and circuitry for blocking transmission of such communication to the device from which the communication is initiated and enabling communication from the device through the star network hub to all other devices connected to the hub.

11 Claims, 4 Drawing Sheets

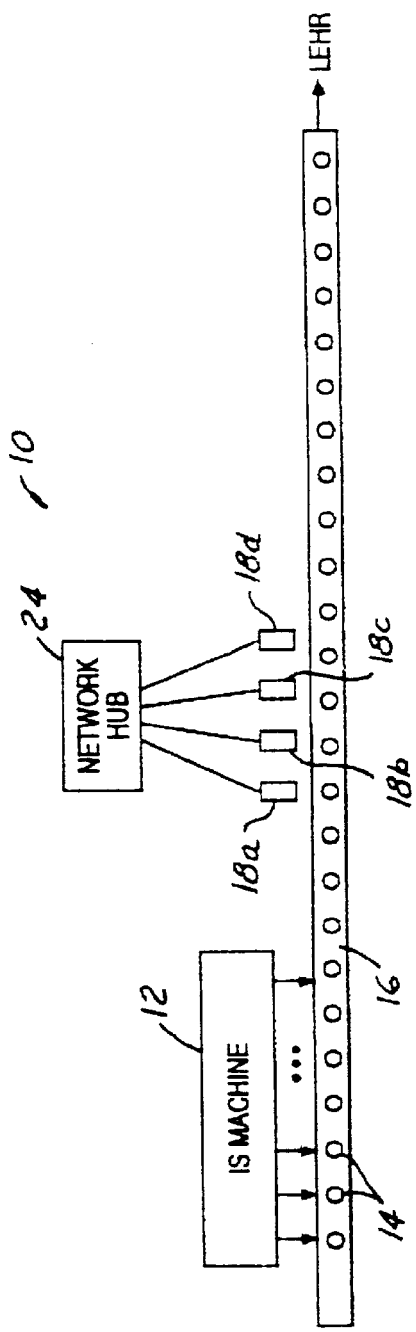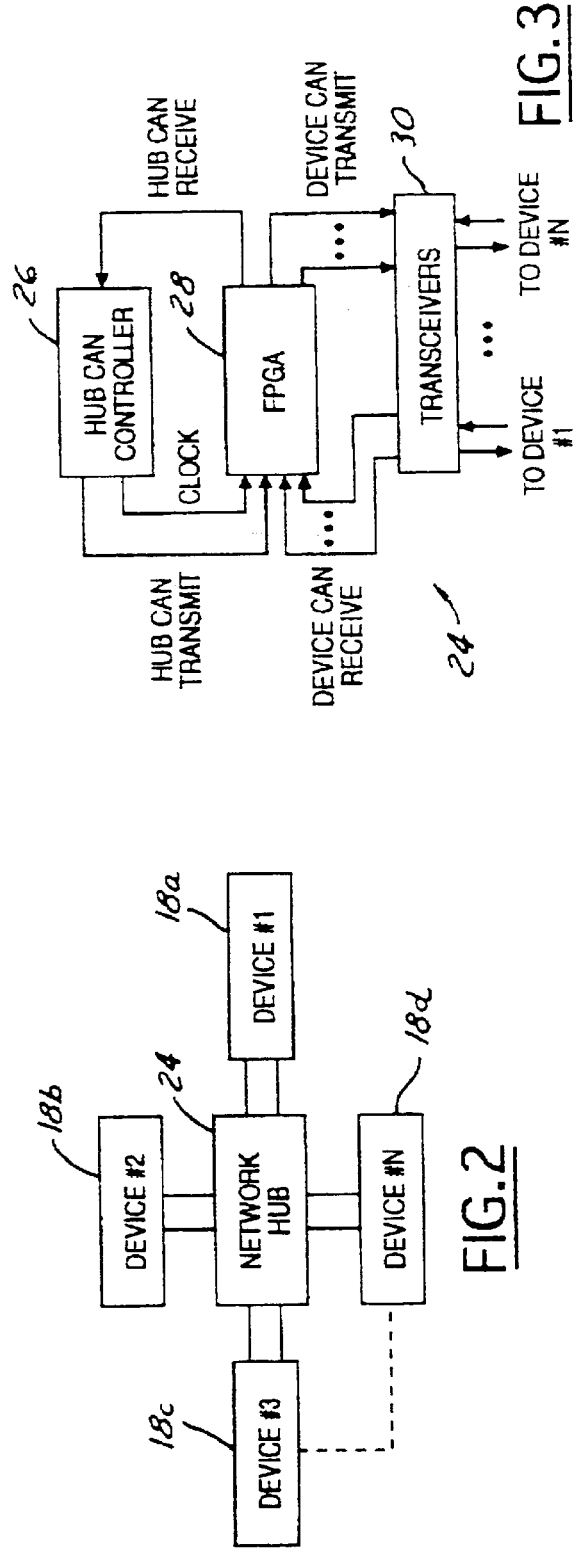

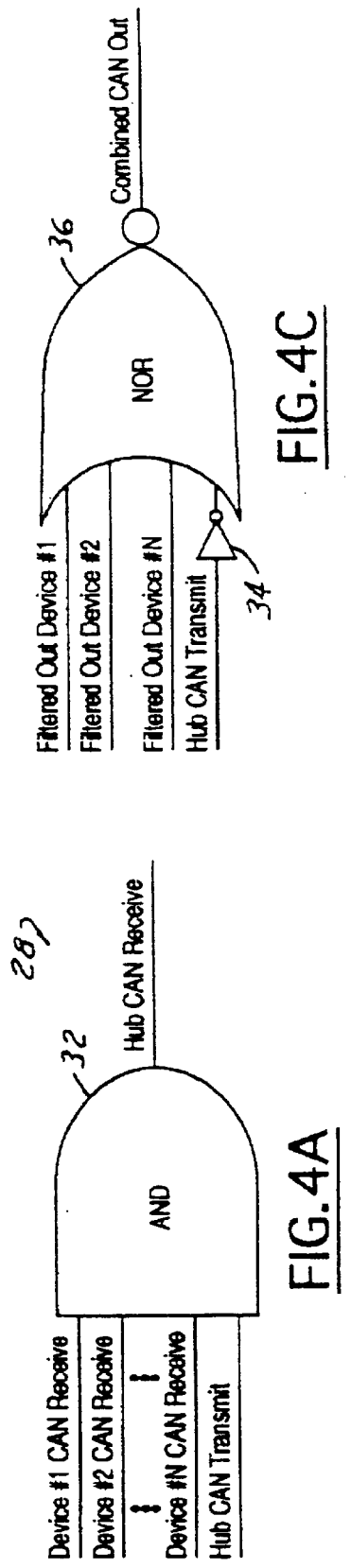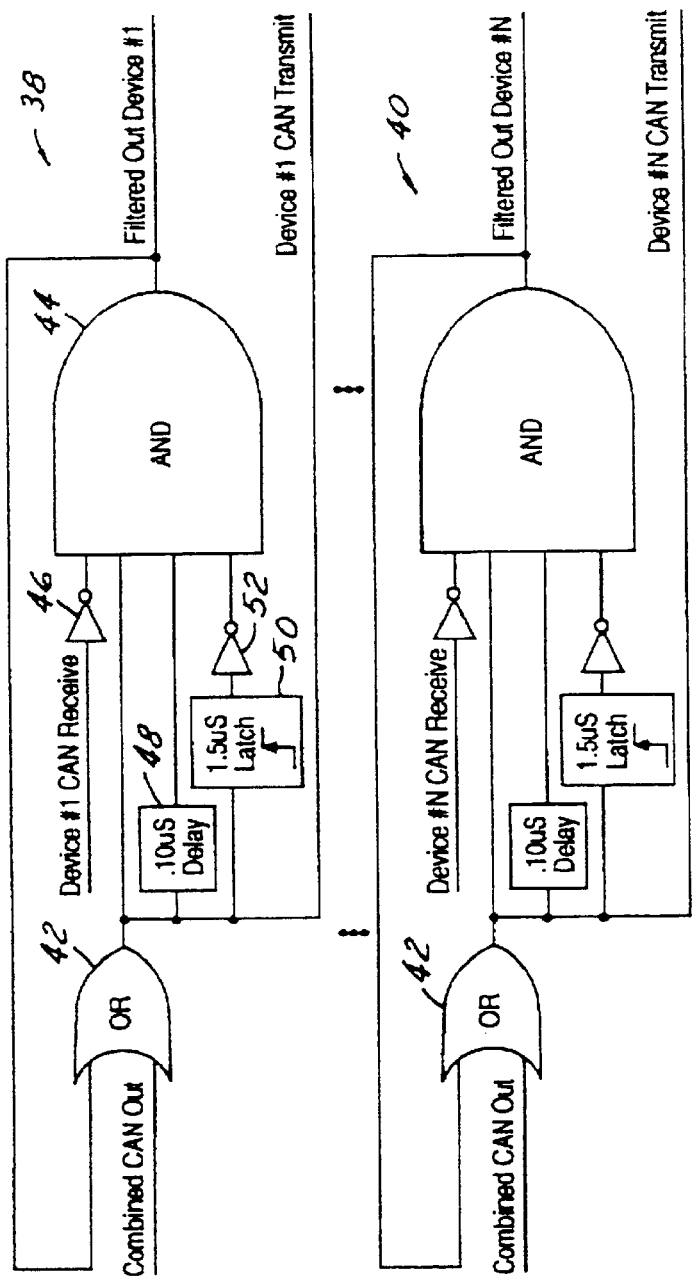

GLASSWARE FORMING SYSTEM WITH STAR NETWORK COMMUNICATION CONFIGURATION

The present invention is directed to manufacture of glassware such as hollow glass containers, and more particularly to a communication system for implementing automatic control of one or more aspects of a glassware forming system.

BACKGROUND AND SUMMARY OF THE INVENTION

The science of glass container manufacture is currently served by the so-called individual section machine. Such machines comprise a plurality of separate or individual manufacturing sections, each of which includes a multiplicity of operating mechanisms for converting hot gobs or charges of molten glass into hollow glass containers. In general, each section includes one or more blank molds in which a glass gob is initially formed in a blowing or pressing operation, an invert arm for transferring each blank or parison to a blow mold in which the container is blown to final form, tongs for removing the containers onto a deadplate, and a sweep-out mechanism for sweeping the containers from the deadplate onto a conveyor. Additional mechanisms in the machine provide for closure of mold halves, movement of baffles and blow nozzles, control of mold cooling wind, etc. Other controllable mechanisms control operation of the conveyor, inspection of containers passing along the conveyor, transfer of the containers to an annealing lehr, etc. U.S. Pat. Nos. 4,762,544, 5,580,366 and 5,624,473 illustrate systems of this character.

It is a general object of the present invention to provide a network for interconnecting the operating devices of a glassware manufacturing system for bidirectional communication employing a CANbus communication protocol, in which the length of the interconnection cables need not be identical, which exhibits reduced noise susceptibility, and in which an operating device may be disconnected from the communication network for replacement or repair without interrupting communications among the remaining devices.

A glassware forming system in accordance with one aspect of the present invention includes a plurality of electronic devices for performing operations on articles of glassware. These devices may comprise devices for controlling the glassware forming operation by controlling one or more operating mechanisms of a glassware forming system, or may comprise devices for inspecting articles of glassware for commercial variations that may affect commercial acceptability of the glassware and call for possible adjustment or repair of the glassware forming system. A network interconnects the devices for intercommunication among the devices, and includes a star network hub and conductors connecting the hub to the plurality of devices in a star network configuration for bidirectional communication among the devices through the hub. The star network hub includes a hub controller for controlling operation of the hub according to a CANbus communication protocol, circuitry for sensing initiation of communication from one of the devices, and circuitry for blocking transmission of such communication to the device from which the communication is initiated and enabling communication from the device through the star network hub to all other devices connected to the hub. The star network hub preferably also includes circuitry responsive to termination of communication from the one device for delaying enablement of communication from other devices to accommodate differences in length of the interconnection conductors or fiberoptics.

BRIEF DESCRIPTION OF THE DRAWINGS

The invention, together with additional objects, features and advantages thereof, will be best understood from the following description, the appended claims and the accompanying drawings in which:

FIG. 1 is a schematic diagram of a portion of a glassware manufacturing system embodying a star network communication system in accordance with one presently preferred embodiment of the invention;

FIG. 2 is a functional block diagram of the communication system illustrated in FIG. 1;

FIG. 3 is a functional block diagram of the star network hub illustrated in FIG. 2;

FIGS. 4A–4C are fragmentary schematic diagrams of the field programmable gate array (FPGA) illustrated in FIG. 3;

DETAILED DESCRIPTION OF PREFERRED EMBODIMENTS

Figure 5:
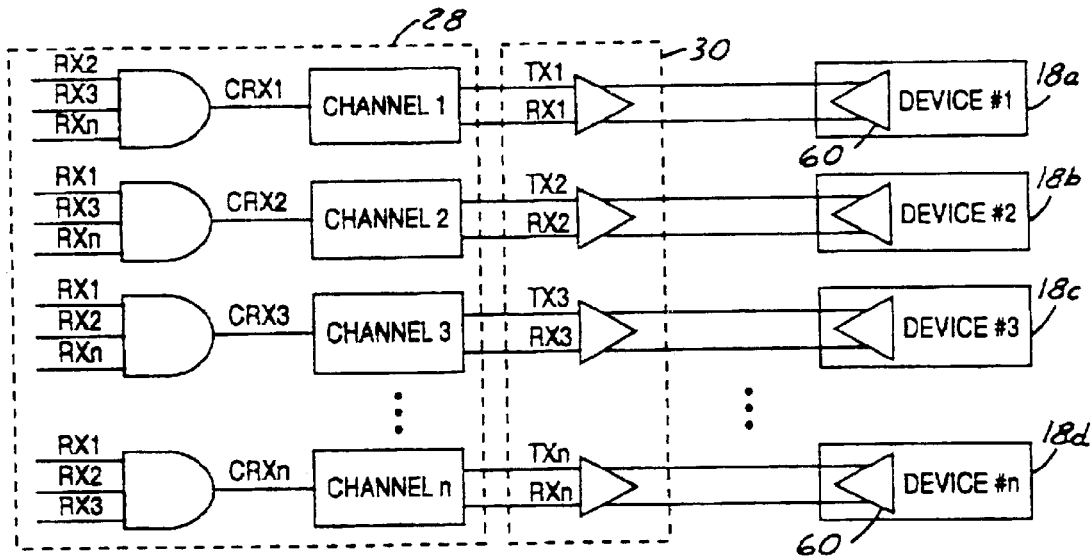
FIG. 5 is a partial block diagram of a second embodiment of the invention.

The disclosures of above-references U.S. Pat. Nos. 4,762, 544, 5,580,366 and 5,624,473 are incorporated herein by reference.

FIG. 1 illustrates a portion 10 of a glassware manufacturing system in accordance with the present invention. An individual section machine 12 manufactures articles 14 of glassware and places the articles in sequence on an endless belt conveyor 16. The hot glassware is transported by conveyor 16 through a sequence of inspection stations 18a–18d, and thence to an annealing lehr for stress relief, etc. Machine 12 may be as disclosed, for example, in U.S. Pat. No. 4,362,544.

In accordance with the present invention illustrated in FIGS. 1 and 2, inspection devices 18a–18d are interconnected in a star communication configuration with a star network hub 24. In accordance with the present invention, the star configuration in which devices 18a–18d are connected to network hub 24 may be an unbalanced star configuration or network, in which the lengths of the interconnections are or may be unequal. In a presently preferred embodiment of the invention, the devices communicate with each other through network hub 24 employing the so-called CANbus communication protocol, which is a high efficiency serial communication protocol and described, for example, in ISO 11898 specifications, which are incorporated herein by reference. Devices 18a–18d are connected to network hub 24 by bidirectional conductors, with transceivers being positioned in hub 24 and in each of the devices in accordance, for example, with ISO specification 11992, also incorporated herein by reference.

FIG. 3 is a functional block diagram of network hub 24. A hub CAN controller 26 contains suitable programming for supervising and arbitrating communications. Hub CAN controller 26 provides a clock signal and a Hub CAN Transmit signal to a field programmable gate array (FPGA) 28, which in turn provides a Hub CAN Receive signal to hub CAN controller 26. FPGA 28 is connected to a plurality of transceivers 30 for communication with devices 18a–18d, 20 through suitable connections.

FIGS. 4A–4C are schematic diagrams of circuitry contained within FPGA 28. FPGA 28 provides the necessary logic needed to pass one device's communication message to all other devices and to hub CAN controller 26. When hub CAN controller 26 sends the message, it must be sent back to itself since a transceiver is not present. FIG. 4A shows the logic for gating messages from the various devices to the hub CAN controller.

According to CAN protocol, the receive signal from each device stays at a high logical level or recessive state when the device is not sending a message. When a device begins to send a message, the CAN Receive signal from that device will change to a low logic level or dominant state. When no devices are sending a message, all of the Device CAN Receive signals are at a high or recessive state. This will cause all of the Filtered Out Device signals to be at a low logic level, and the Combined CAN Out signal to be at a high logic level. Thus, all inputs to AND gate 32 in FIG. 4A are initially high, and the Hub CAN Receive output to hub CAN controller 26 (FIG. 3) is high. The Hub CAN Transmit input to inverter 34 and NOR gate 36 (FIG. 4C) is high, and all of the Filtered Out Device inputs to gate 36 are low. The Combined CAN Out output from gate 36 is thus initially high.

FIG. 4B illustrates two channels 38,40 for generating associated Filtered Out Device signals, in this case for a device 1 (channel 38) and device N (channel 40). In both channels 38, 40, the Device CAN Receive inputs are initially high and the Combined CAN Out inputs to OR gates 42 are initially high. Thus, as noted above, the Filtered Out Device signals from each channel 38, 40 are initially low, and the Device CAN Transmit outputs are initially high. Each channel 38, 40 includes an AND gate 44 that receives a Device CAN Receive input for the associated device through an inverter 46, and which receives the output of OR gate 42 directly, through a 0.1 microsecond delay 48, and through a 1.5 microsecond latch 50 and inverter 52.

If device 1 begins sending a message (e.g., inspection device 18a in FIGS. 1 and 2), the Device CAN Receive signal for that device will change to a low logic level. This input to channel 38 operates through inverter 46 and gate 44 to switch the Filter Out Device signal for device 1 to a high logic level because the other inputs to AND gate 44 are already at a high logic level. This switching of the Filtered Out Device signal for device 1 will cause the Combined CAN Out signal (FIG. 4C) to change to a low logic level. Thus, in channel 38 of FIG. 4B, the Device CAN Transmit signal for device 1 will remain high due to the Filtered Out Device signal for device 1. This inhibits transmission of the message from device 1 back to device 1 since such retransmission would lock the channel in that state. In the meantime, the Device CAN Transmit signals for the other channels (e.g., channel 40) will change to a low logic level since both the Filtered Out Device signals and the Combined CAN Out signal will be at a low logic level. Thus, communication from device 1 is enabled for transmission to devices 2–N, but is inhibited from retransmission back to device 1 by generation of the Filtered Out Device signal in channel 38 for device 1.

When the Device 1 CAN Receive signal later returns the high logic level, the Filtered Out Device 1 signal (FIG. 4B) will return to the low logic level. The Combined CAN Out signal (FIG. 4C) changes back to the high logic level. For the devices other than the transmitting device (device 1 in this example), the Device CAN Transmit signals (FIG. 4B) return to the high logic level. However, the 0.10 microsecond delay 48 and the 1.5 microsecond positive edge-triggered latch 50 will maintain the Filtered Out Device signal for device 1 at the low logic level for 1.5 microseconds. The Device CAN Receive signal for each associated device 2–N will have no effect during the 1.5 microsecond delay period that the latches 50 are active. After this 1.5 microsecond time delay period, the Device CAN Receive signal will be enabled to change the Filtered Out Device signals for devices 2–N.

This latching of the Filtered Out Device signals is used to prevent false errors from being detected during the CAN acknowledgment bit portion of the communication messages. According to CAN communication protocol, a transmitting device (device 1 in the present example) sends a recessive state bit at the end of a message calling for acknowledgment. Any other device that successfully received the message must reply with a dominant bit, which the transmitting device is waiting to detect. To accommodate the possibility of different cable lengths between each device and the network hub, the delays before each device's acknowledgment arrives can vary. Use of latch delays 50 prevents each device from detecting an error due to time differences with another device's trailing edge of the acknowledge bit. In a hub implementation employing CAN protocol at a speed of 250,000 bits per second, 4 microseconds is required to transmit one bit. Every bit is sampled by CAN Controller 26 in each device at about 2.5 microseconds into the bit time. The delay of 1.5 microseconds at latches 50 is selected to ensure that bit information transmitted to the various devices will be at the correct logic level at the time it is sampled.

Figure 6:
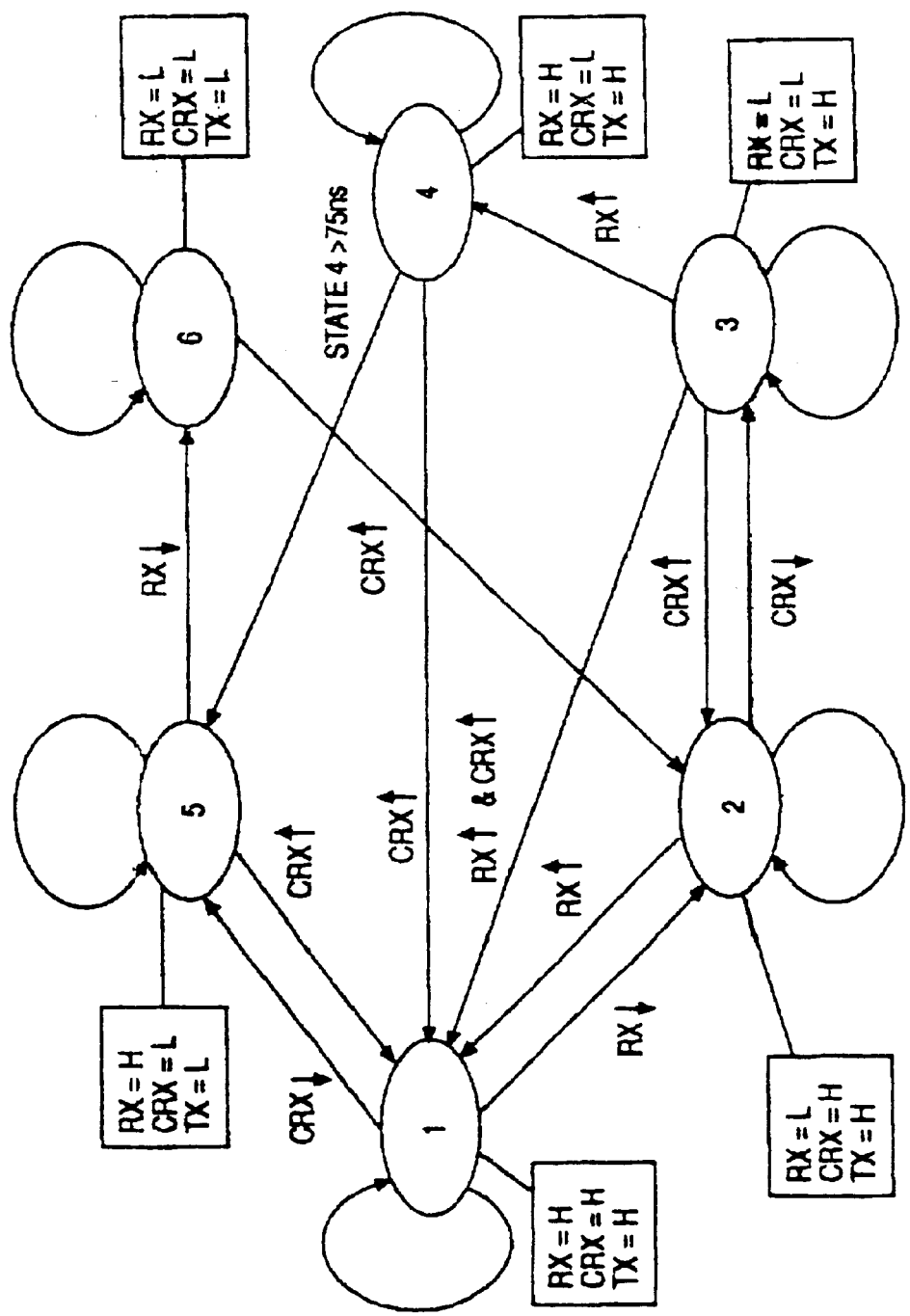
FIG. 6 is a state diagram that illustrates operation of each channel in the embodiment of FIG. 5.

FIG. 5 is a partial block diagram of another embodiment of the invention, which illustrates that the transceiver 30 for each channel is connected to a corresponding transceiver in each device 18a–18c and 20. The transmitting state of each device is dependent upon whether the dominant state is generated by that device or another. In determining the logic for setting the output state of the transmitter (TXn), the inherent delay in the transceiver must be taken into consideration. When the transmitter (TXn) is put in a dominant state, it will be up to 75 nsec. later before the receiver (RXn) will register the change in state. This can create problems in determining the proper state of the transmitter during these transition periods. FIG. 6 is a state diagram for the RX signal from the transceiver to FPGA 28, the transmit (TXn) signal from the FPGA, and the combined receive (CRXn) signal from the other CAN channels. There are six definable states for each channel, as follows:

State 1—This is the normal State of the network when none of the devices are trying to communicate. The receive input will be in its recessive state (RXn=H), the combined receive input from all the other devices will be recessive (CRXn=H), and the state of the transmit line will be recessive (TXn=H).

State 2—This State has the RXn input dominant (RXn=L), the CRXn input recessive (CRXn=H), and the transmit output recessive (TXn=H). This State is a transitory condition that is caused by the delays through the transceiver and the high clock speed of the state machine. It can be entered into through three different sets of circumstances.

State 1 to State 2—This is the most likely entry means into State 2. The device connected to the channel in question begins transmission (RXn goes low.) Since no other devices are transmitting at that time, the CRXn input will be in a recessive state. (This will change later when the dominant state of RXn is transmitted to the other devices and returned to RXn through the CRXn input.) Under these conditions the dominant state should not be broadcast back to the originating device on that channel, which would cause the network can get locked in the dominant state. Therefore, TXn should remain recessive allowing the connected device to control the state of the RXn input.

State 3 to State 2—This transition is a temporary condition that can arise because of the delay in the transceiver reporting back a change in state for its network segment (75 nsec. delay). If during the acknowledge part of the transmission two devices register a dominant input on the same clock cycle, both TX outputs would be in a high state. If the CRXn input goes recessive before the local device, the channel could momentarily be in State 2 until the local device returns to a recessive state. This transition is possible but not very likely to occur.

State 6 to State 2—This transition is also a temporary condition due to transceiver delay. The controlling device has returned to the recessive state and the local TX output has changed to the recessive state, but the RX input has not yet registered the change because of the delay through the transceiver.

State 3—This State is the normal State for a transmission where the dominant state is originated from the local device. The RXn input will be low, and the CRXn input will also be low because the dominant state that is being transmitted to the other devices is being reported back to their associated RX inputs. By looking at FIG. 5, it can be seen that all but the local RX inputs are combined to make the CRX input. Therefore, after the transceiver delays have expired, the CRX input will also be in the dominant state. Since the local device is initiating the dominant state, the local TX output will remain recessive. This State can only be entered from State 2.

State 4—While this State can only be entered from State 3, there are two possible exits from this State. If the local device is the only device that was transmitting the dominant state, then the CRX input should return to the recessive state after the transceiver delay has elapsed and return this channel to State 1. If however, after 75 nsec. (length of transceiver delay), the CRX input has not gone recessive, then another device is also transmitting a dominant state and the output of the local TX should change from recessive to dominant. If more than one channel is transmitting a dominant state, the channel should ideally go directly from State 3 to State 5 when the local RX input goes recessive, but there is no direct way to distinguish between the two possibilities (State 3 to 5 or State 3 to 4). The only way of determining which case is currently active is by going into State 4 and seeing if the CRX input lasts more than 75 nsec. This momentary error in output state should not create a communications problem because it occurs at the bit transitions and the bit is not sampled until much later in the bit time.

State 5—This is a transitory State that occurs because of transceiver delays. It occurs when the dominant state is generated from a device other than the local one (CRX=L). There can be as much as 75 nsec. delay from when the TX output goes dominant to when it is reported by the RX input. The channel will be in this State until the receiver (RX) catches up with the transmitter (TX). This State is entered from either State 1 or State 4, and in both cases is only a transitional State needed to get to the final State, which is State 6.

State 6—This State is the result of the dominant state being generated by a device other than the local device (CRX input). The only difference between this State and State 3 is the condition of the TX output. Since the dominant state is externally generated, it must be communicated to the local device by pulling the TX output low (dominant state). The channel will stay in this State until the CRX input goes back to the recessive state. When the CRX input goes recessive, then the channel will transition through State 2 on its way back to State 1. This State is entered because of the transceiver delays.

Figure 7:
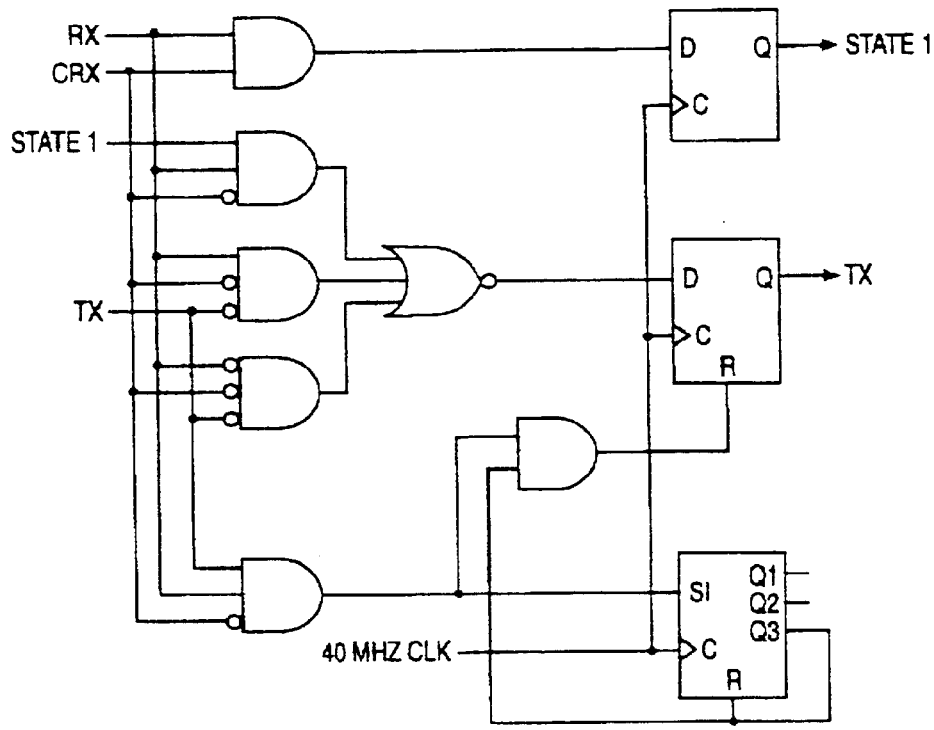
FIG. 7 is a detailed block diagram of each channel in the embodiment of FIG. 5.

The logic for each channel to support the state diagram in FIG. 6 is shown in FIG. 7. It has been simplified to minimize space required within the FPGA. The logic looks only at those States that would cause the TX output to go low. A shift register is used to determine the length of time the channel stays in State 4. By using a 40 MHz clock, a three stage shift register provides the required 75 nsec. delay. If a different clock frequency is used, the number of stages in the shift register must also be changed.

There has thus been disclosed a glassware forming system, which employs a star network configuration for communication among operating devices, that fully satisfies all of the objects and aims previously set forth. Although the communication system of the present invention has been disclosed in conjunction with a presently preferred implementation for inspecting hot glassware between an individual section machine and an annealing lehr (FIG. 1), other implementations are contemplated. For example, the communication system of the present invention can be employed for communication between and among computers for operating individual sections of the glassware forming machine, as disclosed for example in above-referenced noted U.S. Pat. Nos. 5,580,366 and 5,624,473. The communication system of the present invention can also be employed for communication among hot end and/or cold end inspection equipment as disclosed, for example, in above-referenced U.S. Pat. No. 4,762,544. The network hub in the preferred embodiments of the invention employs a field programmable gate array, which is a commercially available programmable logic device that contains an array of hardware logic elements that are variably configurable to process signal data. However, FPGA 28 could be replaced by an array of standard hardware logic elements, if desired. Other modifications and variations will readily suggest themselves to persons of ordinary skill in the art. The invention is intended to embrace all such modifications and variations as fall within the spirit and broad scope of the appended claims.

What is claimed is:

1. In an individual section machine glassware forming system that includes an individual section machine with a plurality of individual sections for forming glass gobs into articles of glassware, a conveyor for receiving and transporting articles of glassware from the machine, and a plurality of electronic devices responsive to operating conditions in said system for controlling at least one aspect of system operation, a network interconnecting said devices for intercommunication among said devices comprising:

a star network hub and means connecting said hub to said plurality of devices in a star network configuration for bidirectional communication with each other among said devices through said hub, said star network hub including:

a hub controller for controlling said bidirectional communication with each other among said devices according to a CANbus communication protocol, means for sensing a communication transmitted from one of said devices, and means responsive to said sensing means and to said hub controller for blocking transmission of communication to said one of said devices and for enabling communication from said one of said devices through said star network hub to all other devices connected to said hub, said means responsive to said sensing means comprising a plurality of channels, one for each of said devices, with each said channel including a gate having an output for enabling communication from the associated device, one input for receiving communication from the associated device, and a second input coupled to said output through delay means for delaying enablement of communication from said associated device.

2. The system set forth in claim 1 wherein said sensing means and said means responsive to said sensing means comprise a field programmable gate array.

3. The system set forth in claim 1 wherein said devices comprise means for inspecting glassware on said conveyor.

4. In a glassware forming system that includes a plurality of electronic devices for performing operations on articles of glassware, a network interconnecting said devices for intercommunication among said devices comprising:

a star network hub and means connecting said hub to said plurality of devices in a star network configuration for bidirectional communication among said devices through said hub, said star network hub including:

a hub controller for controlling said bidirectional communication among said devices with each other according to a CANbus communication protocol, means for sensing a communication transmitted from one of said devices, and means responsive to said sensing means and to said hub controller for blocking transmission of communication to said one of said devices and for enabling communication from said one of said devices through said star network hub to all other devices connected to said hub, said means responsive to said sensing means comprising a plurality of channels, one for each of said devices, with each said channel including a gate having an output for enabling communication from the associated device, one input for receiving communication from the associated device, and a second input coupled to said output through delay means for delaying enablement of communication from said associated device.

5. The system set forth in claim 4 wherein said star network hub further includes means responsive to termination of communication from said one of said devices for delaying enablement of communication from other of said devices to accommodate differences in lengths of said connecting means.

6. In a glassware forming system that includes a plurality of electronic devices for performing operations on articles of glassware, a network interconnecting said devices for intercommunication among said devices, comprising:

a star network including a network hub connecting said plurality of devices in a star network configuration for bidirectional communication with each other among said devices through said hub, said star network hub including:

a hub controller for controlling said bidirectional communication among said devices with each other according to a CANbus communication protocol, first electronic gates for sensing a communication transmitted from one of said devices, and second electronic gates responsive to said first gates and to said hub controller for blocking transmission of communication to said one of said devices and for enabling communication from said one of said devices through said star network hub to all other devices connected to said hub, said first electronic gates form a plurality of channels, one for each of said devices, with each said channel including an enabling gate having an output for enabling communication from the associated device, one input for receiving communication from the associated device, and a second input coupled to said output through delay gates for delaying enablement of communication from said associated device.

7. The system set forth in claim 6 wherein said star network hub further includes third electronic gates responsive to termination of communication from said one of said devices for delaying enablement of communication from other of said devices to accommodate differences in lengths of said connecting means.

8. The system set forth in claim 6 wherein said first and second electronic gates, including said enabling gates and said delay gates, are part of a field programmable gate array.

9. In an individual section machine glassware forming system that includes an individual section machine with a plurality of individual sections for forming glass gobs into articles of glassware, a conveyor for receiving and transporting articles of glassware from the machine, and a plurality of electronic devices responsive to operating conditions in said system for controlling at least one aspect of system operation, a network interconnecting said devices for intercommunication among said devices comprising:

a star network hub and means connecting said hub to said plurality of devices in a star network configuration for bidirectional communication with each other among said devices through said hub, said star network hub including:

a hub controller for controlling said bidirectional communication with each other among said devices according to a CANbus communication protocol, means for sensing a communication transmitted from one of said devices, and means responsive to said sensing means and to said hub controller for blocking transmission of communication to said one of said devices and for enabling communication from said one of said devices through said star network hub to all other devices connected to said hub, said sensing means and said means responsive to said sensing means comprising a field programmable gate array, said means responsive to said sensing means comprising a plurality of channels, one for each of said devices, with each said channel including a gate having an output for enabling communication from the associated device, one input for receiving communication from the associated device, and a second input coupled to said output through delay means for delaying enablement of communication from said associated device.

10. The system set forth in claim 9 wherein said star network hub further includes a plurality of transceivers for connection to said devices.

11. The system set forth in claim 9 wherein said star network hub further includes means responsive to termination of communication from said one of said devices for delaying enablement of communication from other of said devices to accommodate differences in lengths of said connecting means.

* * * * *